United States Patent Office 3,312,639
Patented Apr. 4, 1967

3,312,639
ODOR SUPPRESSION IN UREA-FORM-
ALDEHYDE FOAMS
Ged H. Justice, Hopewell, Va., assignor to Allied Chemical Corporation, New York, N.Y., a corporation of New York
No Drawing. Filed Oct. 12, 1965, Ser. No. 495,304
11 Claims. (Cl. 260—2.5)

This application is a continuation-in-part of application Ser. No. 157,255, filed Dec. 5, 1961 now abandoned.

This invention relates to urea-formaldehyde resin foams, and more particularly to such foams in which the formaldehyde odor is substantially suppressed or avoided, and to a process for preparing such odor-free foams.

Urea-formaldehyde foams have been prepared in the past and are useful when solidified, as acoustic and insulating compositions.

Urea-formaldehyde foams can be prepared by a variety of methods. According to one method foams of this type are prepared by separately producing (1) a partially resinified aqueous urea-formaldehyde solution and (2) a liquid acidic foam, as by atomizing air into water, a foaming agent, and an acidic material hardening agent for the resin and thereafter mixing resin solution and foamed hardener as in a foam gun under conditions promoting intermixing of the two solutions without destruction of the cell structure of the foam, and thereafter curing the resulting resinous foam. According to another method the urea-formaldehyde solution is mixed with an aqueous acid solution, and the mixture is subsequently foamed.

In spite of the excellent insulating properties of such hardened urea-formaldehyde foams, their use has been considerably limited, especially in home insulating applications, not only because of the strong formaldehyde odor which accompanies preparation of the resinified foam, making its application disagreeable and offensive to workmen who apply the foam to the mold cavities, but also because odor may persist in the finished insulation over considerable periods of time.

As is well known, the odor of formaldehyde, even in low concentrations is extremely pungent and is irritating to the eyes and respiratory systems of those who come in contact with it.

In accordance with the present invention stable urea-formaldehyde resin foams suitable for insulation, and having greatly reduced or non-detectable formaldehyde odor can be prepared according to the invention wherein a small proportion of ammonium bircarbonate, $NH_4HCO_3$, or ammonium carbonate $(NH_4)_2CO_3$, preferably together with a terpene such as turpentine, borneol, camphor, pinene or the like, is added to the partially resinified aqueous urea-formaldehyde resin solution and letting the solution stand until formaldehyde odor is substantially reduced prior to mixing the resinous solution with the dilute acid.

In carrying out the process of the invention, aqueous urea-formaldehyde resin solution and acidic hardener can be mixed by any conventional means so long as the additive is introduced into the resinous solution prior to mixing it with the acidic hardener.

The resin solution used in a preferred process of the invention is preferably produced, however, by first preparing a clear, mobile, non-resinous stable fluid composition composed of a mixture of between about 40 parts and about 70 parts by weight of a non-resinous urea-formaldehyde condensation product having an average molecular weight within the range between about 120 and about 240, together with from about 15 to about 45 parts by weight of free formaldehyde, between about 20 and about 60 parts by weight of free urea, between about 45 and about 90 parts of water and about 0.2 percent by weight of an alkali metal hydroxide, or sufficient to bring the pH of the mixture to between about 7.5 and about 10. The above fluid mixture is then heated, for example, at 90°–100° C. for about 10 to about 30 minutes to promote partial condensation. The pH of the mixture is then adjusted to between about 4 and about 6.5 as by addition of formic acid, and heating is continued for between about 15 and about 20 minutes in a second stage of condensation at 90°–100° C. at the indicated pH. The resulting partially cured resin solution is then neutralized and cooled to about room temperature e.g. 25°–30° C.

The hardener solution to be foamed is preferably prepared by adding between about 1% and 10% of a foaming agent to a 0.05 to 0.5 N acid solution. Any conventional foaming agent can be used, and triethanolamine salt of benzene sulfonic acid and "Nacconol SZA," an alkyl benzene sulfonic acid composition of which about 88% consists of the sulfonic acids, and which has a pH of 1.5, etc. have been found suitable. The aqueous acid solution may be of any strong acid such as, for example, sulfuric acid, hydrochloric acid, formic acid, etc. The hardener solution thus prepared is then foamed in any desired manner known to produce a closed cell foam as by mixing with air.

Prior to preparing the foam, sufficient urea is added to the partially cured urea-formaldehyde resin solution to adjust the formaldehyde to urea ratio to between about 1.6 and about 2.0, and between about 0.8 part and about 8 parts by weight, per 100 parts of resin solids (calculated by considering all the urea and all the formaldehyde used in preparing the resin as constituting the resin solids), of $NH_4HCO_3$ or an equivalent amount of

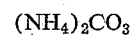
$$(NH_4)_2CO_3$$

based on the $NH_4$ content (i.e. at least about 0.5 part). At this point, between about 0.3 part and about 4 parts per 100 parts of resin solids, of a terpene, as defined is preferably also added, the weight of terpene added being not more than the weight of ammonium bicarbonate or equivalent used.

The foamed hardener solution and the partially cured resin solution are then mixed in any desired manner to produce diffusion of the resin solution into the foam solution without breaking the foam, as by the use of a conventional foam gun. It is preferred, however, to carry out the mixing in accordance with U.S. Letters Patent No. 3,186,959, issued June 1, 1965, to Allied Chemical Corporation by injecting the resin solution into a stream of foam flowing at a space velocity of about 15,000 hr.$^{-1}$ and about 25,000 hr.$^{-1}$ followed by curing of the mixture in a stream flowing at a space velocity of between about 1,500 hr.$^{-1}$ and about 2,500 hr.$^{-1}$ for a period sufficient to produce a self-supporting foam.

The resulting foams are substantially free of formaldehyde odor sufficiently so that installation of the foam may be made without annoyance to workmen from formaldehyde odor. If ammonium carbonate or bicarbonate is used alone as the additive, odor tends to recur in some cases if the resin is stored for substantial periods, for example, of a week or more. Addition of one or more of the indicated terpene additives, however, appears to prevent such odor recurrence indefinitely. This is surprising since use of the terpenes alone has been found to produce no significant odor abatement in the finished foam. The effectiveness of the ammonium carbonate and bicarbonate in the role of odor-reducing additive to urea-formaldehyde resin foams is surprising as many salts, including ammonium chloride, cause collapse of the foam when used in a similar manner, and hence are impractical for the purpose.

According to another preferred method of the invention, ammonium carbonate or bicarbonate can be added to the resin solution, as described above, and then mixed with the acidic hardener solution. Subsequently the entire mixture is foamed.

It was found that the strength and persistence of the formaldehyde odor in the uncured fluid foam and also in the solid cured foam may be correlated with the free formaldehyde present in the liquid urea-formaldehyde resin solution. The effect of ammonium bicarbonate alone and together with a terpene additive on the free formaldehyde content of a partially resinified urea-formaldehyde resin solution as described above, is illustrated in Table I below.

TABLE I.—FREE FORMALDEHYDE IN RESIN DURING STORAGE

| UF Resin | Days Stored | Free HCHO, percent |
| --- | --- | --- |
| No additive | 0 | 4.43 |
|  | 1 | 4.33 |
|  | 5 | 4.30 |
| Additive, 0.8% NH$_4$HCO$_3$ | *0 | 3.15 |
|  | 1 | 1.92 |
|  | 2 | 1.53 |
|  | 6 | 3.90 |
|  | 10 | 3.90 |
| Additive, 0.8% NH$_4$HCO$_3$; 0.4% turpentine. | *0 | 1.54 |
|  | 1 | 1.49 |
|  | 3 | 1.29 |
|  | 7 | 0.82 |
|  | 8 | 0.68 |

*Tested within 2 hours after additive added.

It will be noted from Table I that while the addition of ammonium bicarbonate alone reduced the free formaldehyde from 4.43% to 1.53% after two days storage, the presence of formaldehyde reasserted itself after 6 days storage. On the other hand, a mixture of turpentine and ammonium bicarbonate not only immediately reduced the free formaldehyde sharply, from 4.43% to 1.54% but the so treated resin, on storage continued to drop in formaldehyde content, reaching 0.68 in eight days.

A suitable method of preparing the stable fluid urea-formaldehyde composition described above, consists in first forming a non-resinous low molecular weight condensation product by reacting urea with a molar excess of formaldehyde, for example, about 4 to about 8 mols of formaldehyde per mol of urea under alkaline conditions, preferably at pH 8 to pH 9 and arresting the reaction when the urea-formaldehyde condensation product has an average molecular weight within the range of about 120 to about 240 as described in U.S. Patent 2,652,377. Example 1 of the aforementioned patent describes a typical preparation of a non-resinous product containing by weight about 15% water, 25% free formaldehyde and the residue chiefly non-resinous urea-formaldehyde product. This stabilized product is available commercially under the trade name "U.F. Concentrate–85."

Use of the stable, fluid urea-formaldehyde composition above described as "U.F. Concentrate–85" is preferred over procedures wherein urea and formaldehyde are used separately since the stabilized mixture appears to result in less tendency toward over-resinification during processing. Thus, whereas the resin must be highly water soluble at the time of mixing with the foam so as to dissolve readily in the aqueous hardener solution of which the foam is composed, the resulting composite resin foam must be resinified so that subsequent cure can be accomplished before the foam breaks. This critical range of resinification is more easily attained and control of cure reaction time is less critical when the stabilized composition is used.

The following specific examples further illustrate the invention. Parts are by weight except as otherwise noted.

*Example 1*

A resin stock solution is prepared by heating a mixture of 100 parts "U.F. Concentrate–85" (containing about 15% water, about 25% free formaldehyde and about 60% non-resinous urea-formaldehyde condensation product), 35 parts urea, and 75 parts water for 10 minutes at 90° C. The pH during this period is about 8. The pH is then adjusted to 6 with 10% formic acid. The solution is heated for an additional 20 minutes at 90° C., then is neutralized with 50% sodium hydroxide and cooled to room temperature (25° C.). The resulting stock solution is stable for at least three months.

A hardener solution is prepared by adding 3 grams of triethanolamine salt of benzene sulfonic acid to 100 grams of 0.3 N hydrochloric acid.

Prior to preparing a foam from the above hardener solution, the following is added to the resin stock solution:

| | Parts |
| --- | --- |
| Urea | 15 |
| NH$_4$HCO$_3$ | 2 |

One part of hardener stock solution is foamed by mixing it with air in a mixing chamber, and one part of resin stock solution containing the added ammonium bicarbonate and urea is then mixed with the foam. The resulting urea-formaldehyde foam has a noticeably reduced formaldehyde odor over that of a similar foam containing no ammonium bicarbonate so that its introduction into the molds is much less unpleasant for workmen. The foam is placed in molds at room temperature where it sets within a few minutes.

Immediately after setting, the foam had very little formaldehyde odor, but odor tended to recur, making such foams objectionable in home insulation.

Substitution of 1.44 parts of $(NH_4)_2CO_3 \cdot H_2O$ for the $NH_4HCO_3$ in the above mixture resulted in a foam which was similar to the first foam in reduced odor.

Substitution of the two parts $NH_4HCO_3$ as indicated above by a mixture of $NH_4HCO_3$ or $(NH_4)_2CO_3 \cdot H_2O$ with any one of turpentine, borneol, camphor and pinene in the proportions of 1 part $NH_4HCO_3$ and 1 part terpene additive or 0.72 part $(NH_4)_2CO_3 \cdot H_2O$ and 0.72 part terpene, results in a fluid foam which is virtually odor free, and which remains free from formaldehyde odor after setting.

*Example 2*

In an alternative procedure, resin for use in the foaming process was prepared and partially cured by the following procedure: To a 50-gallon conical tank was added 100 pounds urea-formaldehyde concentrate (equivalent to 59 wt. percent HCHO—26% urea—15% water), 35 pounds urea, 90 pounds water and 2.5 pounds ethylene glycol, as a resin stabilizer. The mixture was agitated and heated for about 30 minutes at 95° C. The solution pH was then adjusted to 4.5 by addition of 4 N formic acid and heated for about 10 minutes at 95° C. until solution viscosity was 20 centipoise when measured at 40° C. The resin solution pH was then adjusted to 8.0 by addition of 50% aqueous NaOH. Two pounds of $NH_4HCO_3$ were stirred into the solution which was then cooled to room temperature for use or storage. Viscosity of the final resin was 45 centipoise at 25° C. The resulting solution was substantially free of formaldehyde odor.

Instead of ethylene glycol as resin stabilizer I may use any water-soluble glycol including diethylene glycol, propylene glycol, butylene glycol, butenediol, butynediol, hexenediol, etc., or I may use furfuryl alcohol, glycerol, or pentaerythritol; any one of the above in proportion, e.g., between about 2 parts and about 10 parts per 100 parts of resin. These additives have the additional advantge of producing a foam with less tendency to shrink upon curing than when these are omitted.

*Example 3*

Into a reaction vessel fitted with a stirrer, water cooled condenser, and thermometer were placed 65.63 pounds of 36.75% formaldehyde solution and 27 grams of 4 N sodium hydroxide to adjust the solution to pH 7.0. To this solution was added 1 pound ethylene glycol and 24 pounds of urea to give a solution with formaldehyde to urea mol ratio 2.07 having a pH of 8.1. The solution was heated to 95° C. during 111 minutes, during which time the pH drifted to 6.2. Then 29 grams of 4 N formic acid solution were added to adjust the solution pH to 5.0. The temperature of the reaction mixture rapidly rose from 95 to 100–102° C. with reflux, and the mixture was cooked for 34 minutes at about 100° C. At this point a drop of resin produced a white cloud in water at 17.5° C. Then the solution was adjusted to pH 8.0 with 77 grams of 4 N sodium hydroxide. The resin was then cooled to 40° C. and 0.9 pound ammonium bicarbonate was added. Resin solution was then cooled to 25° C. and pH adjusted to 8.0 with 293 grams of 4 N sodium hydroxide solution. Resin viscosity at 25° C. was 27 centipoises. The solution was substantially free of formaldehyde odor.

To 17 pounds of this resin the following modifiers were added: 1.18 pounds of urea to adjust the urea-formaldehyde mol ratio; 1.6 pounds of polyethylene glycol (mol wt. 300) to decrease foam shrinkage; 0.45 pound of dimethyl methane phosphate to make foam self-extinguishing in burning tests; and 0.10 pound of sodium pentachlorophenate to make foam fungus and insect resistant.

The hardener solution for use in the foaming apparatus was prepared by preparing a solution of 4% by weight 85% phosphoric acid, 4% by weight Nacconol SZA and 92% by weight water.

Hardener solution was continuously fed at a rate of 3.96 pounds per minute into a mixing vessel. Resin solution was continuously fed into the mixing vessel at a rate of 2.82 pounds per minute. The mixture was continuously fed on to a sparger. Air was continuously introduced through the sparger at a rate of 3.48 cubic feet per minute, to give foam containing bubbles primarily about 0.2–0.6 mm. in diameter. The foaming chamber of the apparatus consisted of a section of 1.5 inch I.D. metal pipe 32 inches long (29.5 inches above the sparger). The foaming chamber contained an air sparger made of a steel disk about 1.5 inches in diameter with 56 holes having a mean opening size of 1/64 inch. The foam was frothed from the top of the foaming chamber into a cure tube, a 1 inch I.D. hose 35 feet long. The foam left the cure tube in a continuous stream and was used to fill numerous large molds. The fluid foam was virtually odor free and remained free from formaldehyde odor after setting.

I claim:

1. In a process for preparing a urea-formaldehyde foam by mixing a partially resinified aqueous urea-formaldehyde resin solution with a dilute acid, the improvement which comprises adding to said resin solution prior to mixing it with said acid, between 0.5 part and 8 parts by weight ammonium carbonate or ammonium bicarbonate, per 100 parts by weight of resin solids, and letting said resin solution stand prior to mixing it with said acid, until formaldehyde odor of said resin solution is substantially reduced.

2. In a process for preparing a solid urea-formaldehyde foam by mixing a partially resinified aqueous urea-formaldehyde resin solution with an aqueous acidic foam, the improvement which comprises adding to said resin solution prior to mixing it with said acidic foam, between about 0.5 part and about 8.0 parts by weight of an ammonium compound selected from the group consisting of ammonium carbonate and ammonium bicarbonate, per 100 parts of resin solids, and letting said resin solution stand prior to mixing it with said acidic foam, until formaldehyde odor of said resin solution is substantially reduced.

3. The process according to claim 2 wherein the aqueous urea-formaldehyde resin solution is prepared by first forming a non-resinous low molecular weight condensation product by reacting urea with between about 4 mols and about 8 mols of formaldehyde per mol of urea under alkaline conditions, arresting the reaction when the urea-formaldehyde condensation product has an average molecular weight within the range of 120 and 240, then adding thereto about 35 parts of urea and about 75 parts of water per 100 parts of urea-formaldehyde condensation product and heating the mixture between about 15 minutes and about 30 minutes, at about 90°–100° C., adjusting the pH of the resulting mixture to about 6 and continuing the heating for about 20 minutes additional, and thereafter neutralizing and cooling the solution.

4. In a process for preparing a solid urea-formaldehyde foam by mixing an aqueous urea-formaldehyde resin solution with an aqueous acidic foam, the step which comprises adding to said resin solution prior to mixing it with said acidic foam, between about 0.5 part and about 8 parts by weight, based on the weight of the resin solids of an ammonium compound selected from the group consisting of ammonium carbonate and ammonium bicarbonate, together with between about 0.3 part and about 4 parts per 100 parts resin solids by weight of a terpene compound selected from the group consisting of turpentine, borneol, camphor and pinene, the weight of said terpene compound being not in excess of the weight of the ammonium compound, whereby the formaldehyde odor of the resulting solid foam is minimized.

5. A solid urea-formaldehyde resin foam prepared from a urea-formaldehyde resin solution containing a small amount, effective to substantially reduce formaldehyde odor of the resin solution, of an ammonium compound selected from the group consisting of ammonium carbonate and ammonium bicarbonate together with a terpene selected from the group consisting of turpentine, borneol, camphor and pinene, the amount of said terpene not exceeding the weight of the ammonium compound used.

6. The process according to claim 2 wherein a small proportion of a compound selected from the group consisting of water-soluble glycols, furfuryl alcohol, glycerol, and pentaerythritol is added.

7. The process according to claim 4, wherein a small proportion of a compound selected from the group consisting of water-soluble glycols, furfuryl alcohol, glycerol and pentaerythritol is added.

8. In a process for preparing a urea-formaldehyde foam by mixing a partially resinified aqueous urea-formaldehyde resin solution with an aqueous solution of an acid, and subsequently foaming the mixture, the improvement which comprises adding to said resin solution, prior to mixing it with said acid solution, between 0.5 part and 8 parts by weight ammonium carbonate or ammonium bicarbonate, per 100 parts by weight of resin solids, and letting said resin solution stand prior to mixing it with said acid solution, until formaldehyde odor of said resin solution is substantially reduced.

9. The improvement of the process of claim 8 wherein between 0.5 and 5 parts ammonium carbonate or ammonium bicarbonate are added to said resin solution, and wherein said resin solution further contains a polyalkylene glycol and a fireproofing agent.

10. A solid urea-formaldehyde resin foam prepared by the process of claim 2.

11. The composition according to claim 10, containing a small proportion of a compound selected from the group consisting of water-soluble glycols, furfuryl alcohol, glycerol and pentaerythritol.

(References on following page)

References Cited by the Examiner

UNITED STATES PATENTS

| | | | |
|---|---|---|---|
| 2,076,295 | 4/1937 | Curs et al. | 260—2.5 |
| 2,193,630 | 3/1940 | Howald | 260—71 |
| 2,250,663 | 7/1941 | Walter | 260—71 |
| 2,652,377 | 9/1953 | Kise | 260—69 |
| 2,813,780 | 11/1957 | Vieli | 260—2.5 |
| 2,970,120 | 1/1961 | Kreidl et al. | 260—2.5 |
| 3,062,682 | 11/1962 | Morgan et al. | 260—2.5 |

MURRAY TILLMAN, *Primary Examiner.*

J. C. BLEUTGE, *Assistant Examiner.*